US005172131A

United States Patent [19]

Crystal et al.

[11] Patent Number: 5,172,131

[45] Date of Patent: Dec. 15, 1992

[54] THERMAL TRANSFER PRINTING PROCESSES WITH MULTI-USE TRANSFER ELEMENTS

[75] Inventors: Richard G. Crystal, Los Altos, Calif.; Robert W. Gundlach, Victor, N.Y.

[73] Assignee: Xerox Corporation, Stamford, Conn.

[21] Appl. No.: 454,800

[22] Filed: Dec. 21, 1989

[51] Int. Cl.[5] .......................... G01D 9/00; B41J 31/00

[52] U.S. Cl. ...................................... 346/1.1; 428/195; 400/241; 400/241.1; 400/241.2

[58] Field of Search ............................ 346/1.1, 76 PH; 400/120, 241.1, 241.1, 241; 428/195

[56] References Cited

U.S. PATENT DOCUMENTS

| | | | |
|---|---|---|---|
| 4,624,881 | 11/1986 | Shini | 400/241.2 |
| 4,652,486 | 3/1987 | Tasaka et al. | 400/241.2 |
| 4,769,258 | 9/1988 | Kobayashi et al. | 428/195 |
| 4,884,908 | 12/1989 | Paffhausen et al. | 400/241.2 |

FOREIGN PATENT DOCUMENTS 0166584 7/1988 Japan .

*Primary Examiner*—Benjamin R. Fuller
*Assistant Examiner*—Huan Tran
*Attorney, Agent, or Firm*—Judith L. Byorick

[57] ABSTRACT

Disclosed is a process for forming images which comprises (a) incorporating into a thermal transfer printing apparatus a multi-use thermal transfer element comprising a substrate upon which is situated a porous sponge layer filled with ink; (b) applying heat imagewise to a portion of the substrate to heat the ink contained in the porous sponge layer, thereby enabling transfer of the ink in imagewise fashion from the porous sponge layer to a receiver sheet in contact with the porous sponge layer; (c) thereafter separating the receiver sheet of step (b) from the transfer element, (d) subsequently contacting the porous layer situated on the portion of the substrate heated in step (b) with a receiver sheet; and (e) thereafter applying heat imagewise to the portion of the substrate previously heated in step (b) to heat the ink contained in the porous sponge layer, thereby enabling transfer of the ink in imagewise fashion from the porous sponge layer to the receiver sheet of step (d). Also disclosed is a thermal transfer printing process with a multi-use thermal transfer element comprising a substrate and a porous sponge layer filled with ink, wherein the process employs resistive heating of the substrate of the transfer element by applying voltage to the substrate. In one embodiment, the ink contains a dye salt resulting from the reaction of a dye and a fatty acid.

56 Claims, 1 Drawing Sheet

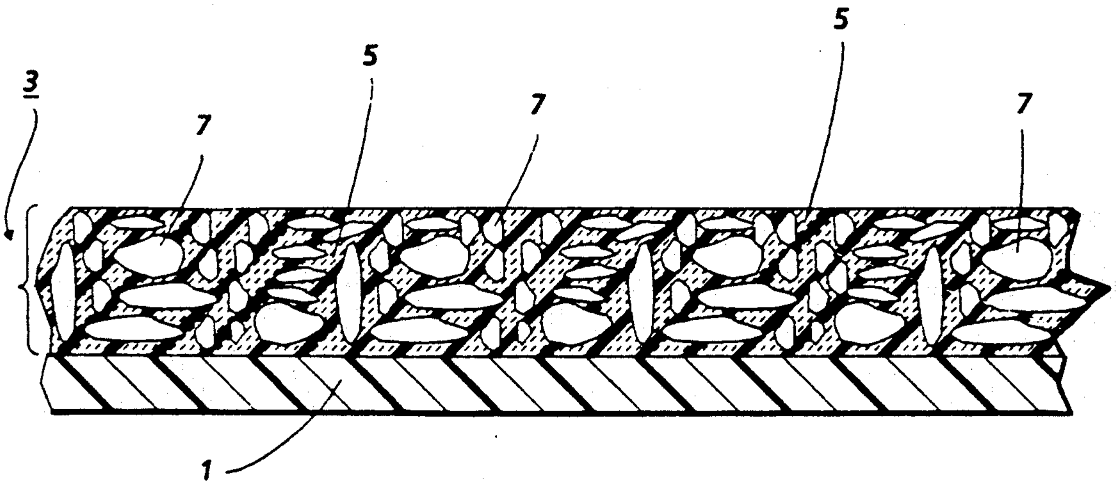
3
7
5
7
5
7
1

THERMAL TRANSFER PRINTING PROCESSES WITH MULTI-USE TRANSFER ELEMENTS

BACKGROUND OF THE INVENTION

The present invention relates to thermal transfer printing, and, more specifically, to multi-use transfer elements suitable for use in thermal transfer printing processes. One embodiment of the present invention resides in a process for forming images which comprises (a) incorporating into a thermal transfer printing apparatus a multi-use thermal transfer element comprising a substrate upon which is situated a porous sponge layer filled with ink; (b) applying heat imagewise to a portion of the substrate to heat the ink contained in the porous sponge layer, thereby enabling transfer of the ink in imagewise fashion from the porous sponge layer to a receiver sheet in contact with the porous sponge layer; (c) thereafter separating the receiver sheet of step (b) from the transfer element; (d) subsequently contacting the porous layer situated on the portion of the substrate heated in step (b) with a receiver sheet; and (e) thereafter applying heat imagewise to the portion of the substrate previously heated in step (b) to heat the ink contained in the porous sponge layer, thereby enabling transfer of the ink in imagewise fashion from the porous sponge layer to the receiver sheet of step (d). Another embodiment of the present invention employs resistive heating to generate images by applying voltage imagewise to the substrate of the transfer element to transfer ink to the receiver sheet.

Thermal printing is a nonimpact printing process that enables formation of high resolution images. These printing processes are simple, offer low noise levels, and are very reliable over extended usages. Thermal printing processes can be classified into three categories. Direct thermal printing entails the imagewise heating of special papers coated with heat sensitive dyes, such that an image forms in the heated areas. Another method of thermal printing is known as the dye transfer or dye sublimation technique, and operates by heating a transfer element coated with a sublimable dye. When the transfer element is imagewise heated, the dye sublimates and migrates to the receiver sheet, which possesses a polymeric coating into which the dye diffuses, forming an image. A third method of thermal printing is known as thermal transfer printing. The thermal transfer printing process entails imagewise heating of a transfer element containing ink, which transfer element is in intimate contact with the heater on one side and with the receiving substrate on the other side. Imagewise heating of the transfer element affects the ink in such a way as to cause it to transfer from the transfer element to the receiving substrate, thereby resulting in image formation. Thermal transfer printing methods generally employ uncoated plain papers, which enables prints with acceptable appearance and excellent archival properties. In addition, the thermal transfer printing method can be employed for color printing applications by using transfer elements of the desired color or colors.

Thermal transfer printing processes generally employ a thermal printhead, a transfer element, and a receiver sheet. The side of the transfer element containing the ink is placed in contact with the receiver sheet, and heat originating from the printhead is then applied to the transfer element. Heat conducted through the transfer element increases the temperature of the ink, which can cause it to melt, soften, decrease in viscosity, or otherwise undergo a transition that enables at least some of the ink to transfer to the receiver sheet. After the receiver sheet and transfer element are separated, an image remains on the receiver sheet. An alternative method of heating the transfer element, known as resistive heating, employs an array of electrodes instead of thermal printhead to generate a current between the electrodes and a grounded conductive layer in the transfer element. This method is described in the *IBM Journal of Research & Development*, Vol. 29, No. 5, 1985, the disclosure of which is totally incorporated herein by reference. Additional information concerning thermal transfer printing processes is disclosed in *Thermal Transfer Printing: Technology, Products, Prospects*, published by Datek Information Services, P.O. Box 68, Newtonville, Mass., the disclosure of which is totally incorporated herein by reference.

The thermal transfer printing process has been disclosed in, for example, U.S. Pat. No. 3,441,940 and U.S. Pat. No. 3,745,586, the disclosures of each of which are totally incorporated herein by reference. In addition, augmented thermal transfer printing processes are known. For example, U.S. Pat. No. 3,989,131 discloses a pressure assisted thermal transfer printing process employing an electrothermic printing unit for writing dot matrix characters on a printing line of recording medium by means of an electrothermal printing head which is continually movable along the printing line. Pressure is interposed between the head and the recording medium, pressure means being provided for pressing the printing elements against the transfer element and the receiver sheet. In addition, U.S. Pat. No. 4,541,042 discloses a transfer recording process assisted by a solvent, wherein a receiving medium such as paper and an ink transfer sheet are placed in contact between a platen and a thermal head, and a liquid, volatile solvent is applied to the paper. The solvent enables high speed thermodissolving transfer of the ink to the paper by heating selected areas to form an image.

Further, U.S. Pat. No. 4,525,722 discloses a thermal transfer printing process assisted by chemical heat amplification, wherein some of the heat necessary for melting and transferring the ink from a solid fusible layer in a ribbon to a receiving medium is provided by an exothermic reaction involving an exothermic material contained in a layer in the ink ribbon. Also, U.S. Pat. No. 4,549,824 discloses a thermal transfer printing process aided by an exothermic reaction, wherein an aromatic azido compound is added to the ink, said azido compound being one that exotherms at the conditions of thermal ink transfer. In addition, U.S. Pat. No. 4,550,324 discloses an ink transfer thermal printer utilizing a thermosensitive ink that is solid at normal temperatures, with selected portions of the ink being liquefied by heating and transferred onto recording paper. The printer may be of either contact or non-contact (ink jet) configuration, and eliminates the need to utilize disposable materials such as ink ribbons.

U.S. Pat. No. 4,567,489, discloses a thermal printhead for a thermographic printer having an electrically insulating substrate on which resistors are placed that form impression points and current supply and current discharge leads bonded to the resistors. The printhead includes a structure for forming a magnetic field that acts on the resistors in the immediate proximity of the resistors and along the resistor print line. The magnetic field is directed such that when the current flows through the resistors, the current paths are deflected upward into the upper part of the resistor on its outer surface. The single resistor impression points thus reach their highest temperature at the printing surface where they must deliver heat to the recording medium, which results in the heat needed for heating the resistor being supplied more quickly to the recording medium, thereby reducing the cooling time of the single resistor impression point so that a higher printing velocity can be attained with the thermal printhead.

Additionally, U.S. Pat. No. 4,510,511 discloses a picture recording method and apparatus using an ink containing an evaporable coloring matter, which enables printing on a medium without an ink ribbon. The special ink is supplied to an ink transporting means and then cooled below the melting point of the ink bonding agent. A discharge energy is applied, controlled according to the picture to be formed, which causes the coloring matter to fly to the recording medium opposite the transporting means. Essentially, the process entails fluidizing a marking material by heat, picking up the liquid marking material on a gravure type roll, and selectively transferring it to the receiving sheet by means of a high voltage field.

One difficulty encountered with thermal transfer processes that employ single use transfer elements or is the cost incurred for materials and supplies required for the thermal transfer printing process. A single use thermal transfer element is bulky and expensive since a full panel of the ribbon must be used for each print formed; for full color prints, four panels of a single use transfer element must be used to form a single print. Thus, a thermal transfer element capable of multiple uses greatly reduces the expenses incurred for materials and supplies in thermal transfer printing processes, and also enables ribbon cassettes of smaller size. In addition, a single use thermal transfer element which uses a full panel of the ribbon for each print formed can be readable subsequent to use. A multi-use thermal transfer element, in contrast, offers an information security advantage, since it is generally unreadable subsequent to printing, particularly if the transfer element has been used more than once.

The present invention resides in a multiple use thermal transfer sheet comprising a porous sponge structure from which ink is metered in a controlled fashion. Porous ink bearing media are known. For example, U.S. Pat. No. 4,046,073, the disclosure of which is totally incorporated herein by reference, discloses a printing or copying system in which ink is transferred from an ink-bearing medium, which can be a porous medium filled with ink in the pores, to a printing medium through the use of ultrasonics. The ink bearing medium is placed in contact with the paper and ultrasonic energy is applied to the medium, causing the ink to decrease in viscosity due to ultrasonic vibrations and conversion of ultrasonic energy into heat. The ink is then transferred to a printing medium. In addition, European Patent Application 0,254,420 discloses a recording method wherein a recording member generally in the form of a cylinder and having on its outer surface one or more porous layers impregnated with ink is heated on the outer surface in image configuration. Ink contained in the cylinder is thus brought to the surface of the imaging member and transferred to a recording sheet in imagewise fashion.

Ink compositions containing liquid crystalline materials are known. For example, U.S. Pat. Nos. 3,969,254 and 4,022,706 disclose cholesteric liquid crystal water base inks. Films formed from these inks can be used as temperature indicators and ornamental articles, and may also be used for photograph reproduction by irradiating through a negative placed on the film such that the exposed areas of the film undergo a temperature response change which is stable for long periods of time. Typically, the inks comprise an oil in water latex, a small amount of organic solvent, which is usually polar and moderately water soluble, liquid crystals, a thickening agent, and, optionally, a wetting agent.

In addition, U.S. Pat. No. 3,974,317 discloses thermometric compositions for recording changes in temperature which comprise a cholesteric liquid crystal system and a chemically inert substance immiscible with the crystal system. Varying the amount of the inert substance in the composition varies the temperature at which a predictable phase change to the isotropic phase occurs. All compositions in a particular product have the same color and exhibit the same color change.

Further, U.S. Pat. No. 3,666,947 discloses a liquid crystal imaging system employing an imaging member with a composition having a cholesteric liquid crystalline phase with a radiation absorptive material dispersed throughout the liquid crystalline material. The imaging member is thermally imaged by heating portions of the material. The imaging members may also be erased by application of external forces, such as electric or magnetic fields.

In addition, U.S. Pat. No. 4,803,119, the disclosure of which is totally incorporated herein by reference, discloses ink coating compositions for impact typewriter ribbons, which ink coatings comprise a sponge material having dispersed therein an ink comprising pigment particles and a dimer acid. Further, U.S. Pat. No. 3,348,651, the disclosure of which is totally incorporated herein by reference, discloses pressure sensitive ink transfer ribbons, tapes, and sheets having a microporous inking composition for use in typewriters, high speed printers, and optical scanning devices. The pressure sensitive ink transfer medium comprises a shock-absorbent base layer of an elastomeric polymer film having a high degree of resiliency in a direction normal to the plane of the film, an intermediate layer of a thin, non-elastic polymer film bonded to the base layer, and an inking layer bonded to the intermediate layer over substantially its entire working surface and comprising a substantially continuous film of a microporous inking composition. The microporous inking composition consists essentially of a uniformly blended mixture of an elastomeric polymeric binder, an inking compound comprising a non-aqueous, non-volatile ink carrier which is substantially insoluble in the elastomeric polymeric binder and which contains a high concentration of an ink pigment, and a finely ground microporous inorganic filler. Other patents, such as U.S. Pat. No. 3,287,153, U.S. Pat. No. 3,392,042, U.S. Pat. No. 3,484,508, U.S. Pat. No. 3,930,099, U.S. Pat. No. 4,321,286, U.S. Pat. No. 4,544,292, and U.S. Pat. No. 4,624,881, also disclose pressure sensitive porous marking ribbons filled with an exudable marking material. In addition, U.S. Pat. No. 3,351,948, U.S. Pat. No. 3,847,265, U.S. Pat. No. 4,251,276, U.S. Pat. No. 4,414,555, U.S. Pat. No. 4,415,903, U.S. Pat. No. 4,603,986, U.S. Pat. No. 4,608,577, U.S. Pat. No. 4,762,734, U.S. Pat. No. 3,480,962, U.S. Pat. No. 4,128,345, U.S. Pat. No. 4,205,320, U.S. Pat. No. 4,315,267 are of collateral interest.

Although the prior art transfer elements are suitable for their intended purposes, a need continues to exist for thermal transfer elements. In addition, there is a need for thermal transfer elements capable of multiple uses. A need also exists for thermal transfer elements which reduce the cost of thermal transfer supplies in a printing device. Further, there is a need for multi-use thermal transfer elements from which a thermally transferrable ink is metered in a controlled fashion during the printing process. A need also exists for multi-use thermal transfer elements capable of forming images on plain uncoated papers. In addition, there is a need for thermal transfer printing elements which cannot be read subsequent to use. There is also a need for thermal transfer elements from which a greater number of prints can be obtained, which enables smaller ribbon cartridges and reduces the storage space necessary for the ribbons. Further, a need exists for thermal transfer elements capable of forming images on rough papers. Additionally, a need exists for multi-use thermal transfer elements suitable for use in thermal transfer printing systems employing resistive heating.

SUMMARY OF THE INVENTION

It is an object of the present invention to provide thermal transfer elements capable of multiple uses.

It is another object of the present invention to provide thermal transfer elements which reduce the cost of thermal transfer supplies in a printing device.

It is yet another object of the present invention to provide multi-use thermal transfer elements from which a thermally transferrable ink is metered in a controlled fashion during the printing process.

Another object of the present invention is to provide multi-use thermal transfer elements capable of forming images on plain uncoated papers.

Still another object of the present invention is to provide thermal transfer elements which cannot be read subsequent to use.

Yet another object of the present invention is to provide thermal transfer elements from which a greater number of prints can be obtained, which enables smaller ribbon cartridges and reduces the storage space necessary for the ribbons.

It is another object of the present invention to provide thermal transfer elements capable of forming images on rough papers.

It is yet another object of the present invention to provide multi-use thermal transfer elements suitable for use in thermal transfer printing systems employing resistive heating.

These and other objects of the present invention are achieved by providing a process for forming images which comprises (a) incorporating into a thermal transfer printing apparatus a multi-use thermal transfer element comprising a substrate upon which is situated a porous sponge layer filled with ink; (b) applying heat imagewise to a portion of the substrate to heat the ink contained in the porous sponge layer, thereby enabling transfer of the ink in imagewise fashion from the porous sponge layer to a receiver sheet in contact with the porous sponge layer; (c) thereafter separating the receiver sheet of step (b) from the transfer element; (d) subsequently contacting the porous layer situated on the portion of the substrate heated in step (b) with a receiver sheet; and (e) thereafter applying heat imagewise to the portion of the substrate previously heated in step (b) to heat the ink contained in the porous sponge layer, thereby enabling transfer of the ink in imagewise fashion from the porous sponge layer to the receiver sheet of step (d). The transfer element and the process are useful for the formation of black and colored images by means of a thermal transfer printing method.

DESCRIPTION OF THE DRAWING

FIG. 1 illustrates schematically in cross section a multiple use thermal transfer element suitable for the processes of the present invention which contains a porous sponge structure containing ink-filled domains. The medium comprises a substrate 1 of a material such as a polyester, such as Mylar ®, in a thickness of about 0.30 mil. The substrate can also be of a resistive material such as carbon black filled polycarbonate. Bonded to substrate 1 is an ink-filled porous structure 3, in which the porous structure comprises a polymeric material 5 and an ink 7 situated in pores within polymeric material 5 and capable of being transferred from the porous material to a receiver sheet such as paper or transparency material. The ink is a material that undergoes a change upon exposure to heat, such as a decrease in viscosity, a first order phase change such as melting, a second order phase change such as glass transition or softening, or a mesomorphic phase change such as that exhibited by liquid crystals and liquid crystalline polymers.

DETAILED DESCRIPTION OF THE INVENTION

The multi-use thermal transfer elements employed for the processes of the present invention can have any configuration. In one embodiment, the element is in strip or ribbon configuration, and can be contained on a supply means, such as a supply roll or other means for holding a supply of the ribbon, and a takeup means, such as a takeup roll or other means for holding the takeup of the ribbon. As the element is used for imaging, the strip or ribbon can thus be advanced from the supply roll to the takeup roll. The supply roll and takeup roll can be contained within a cartridge if so desired. Heat is applied in imagewise fashion from the thermal printhead in the thermal transfer printing apparatus to the surface of the substrate layer of the element as it is situated between the supply and the takeup. Heat thus applied passes through the substrate to the porous sponge layer situated on the opposite surface of the substrate and causes ink to be expressed from the pores in the sponge layer onto a receiving sheet in imagewise fashion.

Multi-use thermal transfer elements employed for the present invention comprise a substrate and an ink-filled porous layer. The substrate can be of any suitable material, such as paper, glassine, polyester (Mylar ®), polycarbonates, polyimides, polyamides, polyvinyl fluoride (Tedlar ®), polyethers such as polyaryl ethers, polysulfones, poly-α-olefins, regenerated celluloses, and the like. To alleviate the potential problem of the substrate adhering to the printhead, the substrate can be coated, on the side in contact with the heater and farthest from the receiver sheet, with a release coating. Particularly preferred is a substrate of aluminized Mylar ®, which consists of a layer of the Mylar ® coated with a layer of aluminum about 1000 angstroms thick. The aluminum prevents adhesion of the substrate to the printhead and accompanying problems, such as tearing or stretching of the transfer element, and also enhances heat transfer between the printhead and the transfer element. Other coating materials include polyesters, polyamides, polyvinylchloride, polyvinylacetate, polyurethanes, polyolefins, polyvinyl alcohols, silicone oils, waxes, graphite, wax/polymer blends, mixtures thereof, and the like. The coating has an effective thickness, preferably from about 0.05 to 1 micron, although other thicknesses can be used.

Also preferred as substrates are condensor papers, also known as calendared papers, which are inexpensive, need no coating of a release material to prevent adhesion to the printhead, and also enhance heat transfer between the printhead and the transfer element. When a condensor paper substrate is present, an optional adhesive coating between the substrate and the sponge layer prevents delamination of the sponge layer from the substrate. This adhesive coating can be of a material such as a polyvinyl chloride/polyvinyl acetate copolymer, including VYHH, available from Union Carbide Corporation, a polyester soluble in common organic solvents, such as Vitel PE-222, available from Goodyear Corporation, a polyester such as DuPont ® 49000 Polyester Adhesive, and the like. The coating material can be solvent coated onto the substrate from methyl ethyl ketone or a similar solvent by any suitable means, such as draw-down knife coating or gapped blade coating, followed by evaporation of the solvent with or without the application of heat, resulting in a coating thickness preferably of from about 2 to about 3 microns.

In addition, substrates of material such as a polycarbonate filled with carbon black, as described in "Resistive Ribbon Thermal Transfer Printing: A Historical Review and Introduction to a New Printing Technology," *IBM J. Res. Develop.*, vol. 29, no. 5, pages 449 to 457 (1985), the disclosure of which is totally incorporated herein by reference, or other materials providing a suitable resistive heating base can be employed to permit use of the thermal transfer elements of the present invention in resistive heating thermal printing, such as that performed in the IBM Quietwriter ® family of printers.

The substrate has an effective thickness, generally from about 2 microns to about 15 microns, and preferably about 3 microns, although the thickness can be outside this range. For printing processes employing electrical resistive heating processes, the substrate generally has a thickness of from about 6 to about 35 microns (¼ to 178 mil), although the thickness can be outside this range. Substrate thickness can be selected according to a variety of considerations. For example, thicker substrates are mechanically stronger than thinner substrates, and thus are less likely to tear or stretch when subjected to multiple heatings and windings. Thinner substrates have a lesser thermal burden than thick substrates, in that less heat is required to be applied to the substrate in order to effect transfer of the ink to the receiver sheet. In addition, thinner substrates enable increased footage on rolls of the transfer element. Substrates with thicknesses in the stated range generally perform acceptably with respect to all of these considerations. Since the primary function of the substrate is to transport heat from the printhead to the ink layer, its properties should be designed so that it possesses high intrinsic thermal conductivity in addition to possessing sufficient strength to provide support. In addition, the substrate should be formulated in a manner to withstand high printhead temperatures of about 300° C. for several milliseconds without melting, deforming, or charring.

The substrate is coated with a layer of porous ink-filled material to form a thermal transfer element of the present invention. This layer comprises effective amounts of the sponge material and ink, generally from about 20 to about 80 percent by weight, preferably from about 20 to about 50 percent by weight, and more preferably about 30 percent by weight, of the sponge material, and generally from about 20 to about 80 percent by weight, preferably from about 50 to about 80 percent by weight, and more preferably about 70 percent by weight, of the ink, although the relative amounts of sponge material and ink can be outside of this range. Sponge materials having a high loading of the ink in the sponge are preferred, since such sponges will result in a transfer medium capable of several uses. Suitable sponge materials include copolymers of polyvinyl chloride and polyvinyl acetate, such as those commercially available from Union Carbide Corporation as VYHH and VYHD, polyester, such as Vitel ® PE-222, commercially available from Goodyear Corporation, silicone polymers soluble in common organic solvents, polycarbonates, polysulfones, poly phenylene oxides and other organic polymers soluble in common solvents, urethanes, natural rubbers, synthetic rubbers, block copolymers of heat resistant monomers, such as alpha methyl styrene, which are soluble in common organic solvents, polyamides soluble in common organic solvents, such as Emerez ®, commercially available from Emery Industries, and the like. In addition, elastomeric materials, such as the silicone elastomer available from Dow Corning as Sylgard 182 or an abhesive elastomer such as polydimethylsiloxane, can be employed; these materials would contract upon heating, causing the ink to come to the surface of the porous layer in imagewise fashion and to transfer to the receiver sheet.

The porous layer is present in an effective thickness, generally from about 12 to about 25 microns, and preferably about 21 to 22 microns, although this layer can have a thickness outside of this range. For the purposes of the present invention, a thicker sponge layer has desirable advantages in that the layer will be capable of holding more ink, thus enabling several uses of the medium. A porous layer of excessive thickness, however, will require more heat applied to the back of the medium to cause imagewise transfer of the ink to the receiver sheet, since the heat applied must pass through both the substrate and the porous layer. Transfer elements having a porous layer with a thickness in the aforementioned ranges are generally capable of multiple uses and generally do not present an excessive thermal burden.

Preferably, ink compositions selected for the present invention are formulated so that only a small amount of the ink is necessary to provide images with acceptable image density. Thus, the ink compositions preferably have high pigment or dye concentrations of from about 2 to about 25 percent by weight. Ink compositions suitable for the porous layer include four classes of materials, all of which undergo some change upon heating. This change preferably occurs in the temperature range of from about 40° to about 150° C., and more preferably from about 50° to about 65° C. to minimize blocking and thermal burden, although material that undergo a change at significantly higher temperatures are also acceptable for the processes of the present invention. One class of materials consists of liquid inks for which the viscosity decreases upon being heated from room temperature, which is generally from about 15° C. to about 35° C., to the aforementioned temperature range. For example, an ink of this type might have a viscosity of from about 50 centipoise to about 2,000 poise at room temperature, and a viscosity of from about 10 centipoise to about 200 poise upon being heated to a temperature of from about 40° C. to about 150° C. The difference in the viscosity at room temperature and the viscosity at a temperature of from about 40° C. to about 150° C. is sufficient to allow the ink to flow from the porous sponge layer to the receiver sheet. Generally, the ink in its unheated state has a typical viscosity of at least about 10 centipoise, and the viscosity can be as high as a value corresponding to the solid state of the ink in its unheated state. In its heated state, the ink generally has a typical viscosity of 1000 centipoise or less, and preferably from 2 to 50 centipoise. Thermal transfer printing processes employing a thermal transfer element having a porous layer in which the pores were filled with this type of ink operate by heating the transfer element imagewise; the viscosity of the ink decreases in the heated areas, permitting the ink to transfer from the porous layer to the receiver sheet, thereby forming the image. Examples of inks of this type include those with liquid ink bases such as vegetable oils, mineral oils, fatty acids, diglycerides, triglycerides, silicone fluids, propylene carbonate, fatty acid esters, fatty acid amines, glycols, polyglycols, alkanes, alcohols, dimer acids, trimer acids, and the like, as well as mixtures thereof. The liquid ink base is present in an effective amount, generally from about 75 to about 98 percent by weight of the ink. Inks of this type also include a colorant, such as one or more pigments or dyes or mixtures thereof, in an effective amount, generally from about 2 to about 25 percent by weight. Additional components can optionally be included in these inks, such as additional colorants, dispersing agents such as surfactants, plasticizers, or the like.

Inks of the type that undergo a change in viscosity upon being heated can be prepared by any suitable method. For example, the components can be maintained at a temperature at which all ink components are liquids or molten, followed by mixing the components by stirring or any other suitable process to obtain a uniform mixture. The molten ink is then coated onto the transfer medium substrate by any suitable process. In addition, the inks can be prepared by dissolving all of the ink components in a suitable solvent, followed by mixing the solution to obtain a uniform mixture, coating the solution mixture onto the transfer medium substrate, and removing the solvent by evaporation or any other suitable process.

A second class of materials suitable as inks for the porous layer consists of materials that undergo a first order phase change, such as melting from the solid state at room temperature (typically from about 15° C. to about 35° C.) to the liquid state upon being heated, preferably to a temperature range of from about 40° C. to about 150° C., and more preferably from about 50° C. to about 65° C., although the material can be one that undergoes a first order phase change outside of this range if desired. Suitable materials generally exhibit a sharp melting point, melt to form a liquid with a relatively low viscosity of no more than about 5 poise, and, preferably, have the ability to increase in volume upon melting, which would force the ink to the surface of the sponge structure. Thermal transfer printing processes employing a thermal transfer element having a porous layer in which the pores were filled with this type of ink operate by heating the ink containing element imagewise; the solid ink in the pores melts, enabling transfer of the ink to a receiver sheet. Upon resolidification of the ink, the ink adheres to the receiver sheet, thereby forming an image. Examples of suitable ink bases for inks of this type include animal fats, saturated vegetable oils, partly saturated vegetables oils, saturated fatty acids, long chain alcohols, amines of fatty acids, amides of fatty acids, esters of fatty acids, long chain saturated ethers, polyethylene oxide, vegetable waxes, animal waxes, mineral waxes, synthetic waxes, and the like, as well as mixtures thereof. Additional specific examples of inks of this type include ink bases such as crystalline waxes, saturated long-chain fatty acids with from about 12 to about 50 carbon atoms, saturated long-chain alcohols with from about 12 to about 50 carbon atoms, and the like, as well as mixtures thereof. The ink base is present in an effective amount, generally from about 75 to about 98 percent by weight of the ink. Inks of this type also include a colorant, such as one or more pigments or dyes or mixtures thereof, in an effective amount, generally from about 2 to about 25 percent by weight. Additional components can optionally be included in these inks, such as additional colorants, dispersing agents such as surfactants, plasticizers, or the like.

Inks of the type that undergo a first order phase change upon being heated can be prepared by any suitable method. For example, the components can be maintained at a temperature at which all ink components are liquid or molten, followed by mixing the components by stirring or any other suitable process to obtain a uniform mixture. The molten ink is then coated onto the transfer medium substrate by any suitable process. In addition, the inks can be prepared by dissolving all of the ink components in a suitable solvent, followed by mixing the solution to obtain a uniform mixture, coating the solution mixture onto the transfer medium substrate, and removing the solvent by evaporation or any other suitable process.

A third class of suitable inks includes solid materials that undergo a second order phase change, such as a glass transition or softening upon being heated from room temperature preferably to a temperature range from about 40° C. to about 150° C., and more preferably from about 50° C. to about 65° C., although the material can be one that undergoes a second order phase change at a temperature outside of this range if desired. This phase change can constitute either a transition from a glassy state to a liquid state, or a transition from a glassy state to a tacky state. In the situation involving the transition from a glassy state to a liquid state, images are formed as described herein for inks that typically undergo a first order phase change; the transfer element is imagewise heated, causing the ink to become liquid, transfer to the receiver sheet, and form an image. In the situation involving the transition from a glassy state to a tacky state, imagewise heating of the transfer element causes the ink to become tacky and to adhere to the receiver sheet in imagewise fashion. Examples of inks of this type include those with ink bases such as rosin based polymers, low molecular weight polymers or oligomers with molecular weights of from about 200 to about 1,000 of materials such as polyolefins and substituted polyolefins, including halogenated polyethylenes such as Epolene C16, available from Eastman Kodak Company, copolymers of polyolefins, such as polyethylene/polyvinyl acetate copolymers, including the Elvax polymers available from E. I. DuPont Company, styrene-butadiene copolymers, styrene acrylate copolymers, styrene methacrylate copolymers, and the like, as well as mixtures thereof. The ink base is present in an effective amount, generally from about 75 to about 98 percent by weight of the ink. Inks of this type also include a colorant, such as one or more pigments or dyes or mixtures thereof, in an effective amount, generally from about 2 to about 25 percent by weight. Additional components can optionally be included in these inks, such as additional colorants, dispersing agents such as surfactants, plasticizers, or the like.

Inks of the type that undergo a second order phase change upon being heated can be prepared by any suitable method. For example, the components can be maintained at a temperature at which all ink components are liquid or molten, followed by mixing the components by stirring or any other suitable process to obtain a uniform mixture. The molten ink is then coated onto the transfer medium substrate by any suitable process. In addition, the inks can be prepared by dissolving all of the ink components in a suitable solvent, followed by mixing the solution to obtain a uniform mixture, coating the solution mixture onto the transfer medium substrate, and removing the solvent by evaporation or any other suitable process.

Another class of materials suitable as ink compositions for the present invention consists of those that undergo a mesomorphic phase change upon being heated, such as liquid crystalline molecules and polymers. Ink compositions of this type are described in detail in copending application U.S. Ser. No. 454,817 filed Dec. 21, 1989, concurrently with this application), the disclosure of which is totally incorporated herein by reference. The phase change can constitute either a transition from the solid state to the smectic or nematic state, or a transition from the smectic or nematic state to the liquid state. Inks of this type include those containing azoxyanisoles, cholesterol derivatives, and the like, as well as mixtures thereof. Further information regarding the preparation and characteristics of various mesomorphic materials is disclosed in, for example, *Liquid Crystals—The Fourth State of Matter*, Franklin D. Saeva, ed., Marcel Dekker, Inc., New York and Basel (1979) and *Liquid Crystals: Their Physics, Chemistry and Applications*, C. Hilsum and E. P. Raynes, eds., The Royal Society, London (1983), the disclosures of each of which are totally incorporated herein by reference.

Some examples of classes of materials that exhibit liquid crystalline behavior include 4,4'-di-n-alkoxyazoxybenzenes, p-alkoxybenzoic acids, 4,4'-di-n-alkoxyphenylnitrones, 4-benzylideneamino-4'-methoxybiphenyls with aromatic or heterocyclic functionalities, Schiff's bases, diphenylacetylides, cholesteryl esters, carbonates, S-alkyl carbonates, ω-phenyl alkanoates, thiocholesteryl-ω-phenylalkanoates, and the like.

Examples of suitable liquid crystalline materials include members of the azoxyanisole family exhibiting liquid crystalline behavior, such as esters of azoxyanisole with the following formula:

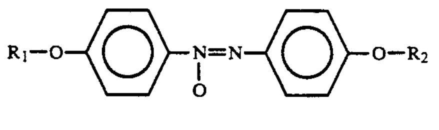

-continued or

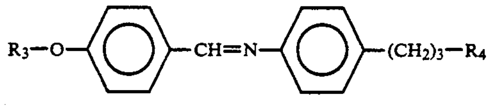

wherein $R_1$, $R_2$, $R_3$, and $R_4$ are independently selected from the group consisting of aliphatic hydrocarbon groups with from about 1 to about 30 carbon atoms, and preferably from about 1 to about 25 carbon atoms. $R_1$, $R_2$, $R_3$, and $R_4$ can also be substituted hydrocarbon groups, such as halogenated hydrocarbons, esterified hydrocarbons, and the like, as well as any combination and/or mixture thereof. Accordingly, examples of liquid crystalline materials from the azoxyanisole family include, but are not limited to, methyl azolyanisole, ethyl azoxyanisole, propyl azoxyanisole, butyl azoxyanisole, pentyl azoxyanisole, hexyl azoxyanisole, heptyl azoxyanisole, and the like as well as mixtures thereof. Additional examples of suitable liquid crystalline materials include members of the cholesterol family, such as esters of cholesterol, including those of the formula:

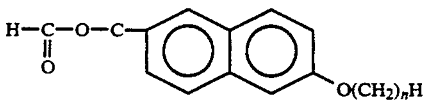

wherein n is a number of from about 1 to about 25 carbon atoms, although the number of carbon atoms can exceed this range provided that the objectives of the present invention are achieved. Accordingly, examples of liquid crystalline materials from the azoxyanisole family include, but are not limited to, dimethyl azoxyanisole, diethyl azoxyanisole, dipropyl azoxyanisole, dibutyl azoxyanisole, dipentyl azoxyanisole, dihexyl azoxyanisole, diheptyl azoxyanisole, or the like, as well as mixtures thereof. For these two classes of liquid crystalline materials, the temperature at which the mesomorphic transition occurs rises as the number of carbon atoms in the hydrocarbon substituent increases. Other examples of suitable liquid crystalline materials for the inks of the present invention include benzoates exhibiting liquid crystalline behavior; naphthates exhibiting liquid crystalline behavior; cinnamates exhibiting liquid crystalline behavior, such as the homologous series of di-n-alkyl p-azoxy-α-methylcinnamates of the formula

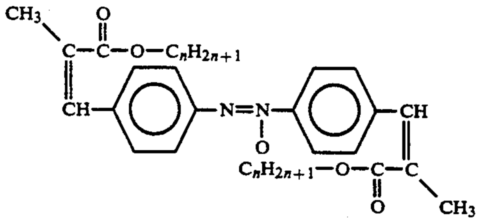

wherein n is a number of from about 2 to about 12, n-hexyl-4-(4'-phenylbenzylideneamino) cinnamate, and the like; pyrimidines, such as 2-(4-n-alkylphenyl)-5-(4-n-alkyloxyphenyl)pyrimidine, wherein n-alkyl has from about 1 to about 25 carbon atoms; benzilidine anilines, such as N-(4-n-alkyloxybenzylidene)-4'-n-alkylanilines, wherein n-alkyl has from about 2 to about 12 carbon atoms and preferably from about 4 to about 7 carbon atoms; cellulosic materials exhibiting liquid crystalline behavior, such as hydroxypropyl cellulose; 4,4'-di-n-alkoxyazoxybenzenes of the formula $C_nH_{2n+1}—O—C_6H_4—N=NO—C_6H_4—O—C_nH_{2n+1}$ wherein n is a number of from about 1 to about 15; 4-n-alkoxybenzoic acids of the formula $C_nH_{2n+1}—O—C_6H_4—COOH$ wherein n is a number of from about 1 to about 15; bis-(4'-n-alkoxybenzal)-2-chloro-1,4-phenylenediamines of the formula $C_nH_{2n+1}—O—C_6H_4—CH=N—C_6H_3Cl—N=CH—C_6H_4—O—C_nH_{2n+1}$ wherein n is a number of from about 1 to about 15; 4-n-butyloxybenzal-4'-alkylanilines of the formula $C_4H_9—O—C_6H_4—CH=N—C_6H_4—C_nH_{2n+1}$ wherein n is a number of from about 1 to about 15 and preferably from about 2 to about 8; materials of the formula

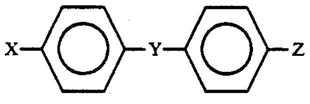

wherein X and Z are independently selected from the group consisting of

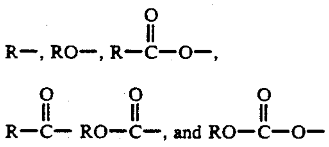

with R being an alkyl group with from 1 to about 25 carbon atoms, and Y is selected from the group consisting of

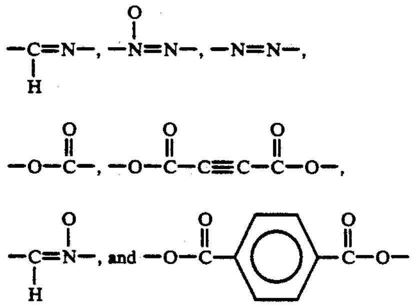

and the like; as well as mixtures thereof. Further information regarding the synthesis and characterization of many of these materials is disclosed in, for example, D. Demus et al., *Mol. Cryst. Liq. Cryst.*, 15:161 (1971); M. J. Billard, *C.R. Acad. Sci., Paris, Ser.* A.B., B280:573 (1975); G. W. Smith et al., *J. Chem. Phys.*, 59:3214 (1973); H. Arnold et al., *Z. Phys. Chem.*, 240:185 (1969); J. A. Castellano et al., *J. Org. Chem.*, 33:3501 (1968); S. L. Arora et al., *J. Org. Chem.*, 35:1705 (1970); W. R. Young, *Mol. Cryst. Liq. Cryst.*, 10:237 (1970); J. P. Schroeder et al., *J. Org. Chem.*, 33:591 (1968); H. Kelker et al., *Angew. Chem.*, 81:903 (1969); H. Kelker et al., *Angew. Chem.*, 82:984 (1970); J. B. Flannery et al., *J. Phys. Chem.*, 74:3611 (1970); D. L. Fishel et al., *Chem. Commun.*, 1557 (1971); W. R. Young et al., *J. Amer. Chem. Soc.*, 94:3976 (1971); W. R. Young et al., *Angew. Chem.* (Int. Ed.) 10:410 (1971); L. E. Knaak et al., *Mol. Cryst. Liq. Cryst.*, 17:171 (1971); H. Hirata et al., *Mol. Cryst. Liq. Cryst.*, 20:343 (1973); L. Verbit et al., *Mol. Cryst. Liq. Cryst.*, 17:49 (1972); F. Jones et al., *J. Chem. Soc. Chem. Commun.*, 841 (1973); J. P. Van Meter et al., *Mol. Cryst. Liq. Cryst.*, 32:271 (1973); R. Steinstrasser, *Angew. Chem.*, 84:636 (1972); D. C. Schroeder et al., *J. Amer. Chem. Soc.*, 96:4347 (1974); W. R. Young et al., *Mol. Cryst. Liq. Cryst.*, 26:7 (1974); J. P. Van Meter et al., *Mol. Cryst. Liq. Cryst.*, 32:285 (1973); J. P. Van Meter et al., *J. Amer. Chem. Soc.*, 95:626 (1973); and L. Verbit et al., *Mol. Cryst. Liq. Cryst.*, 30:201 (1975), the disclosures of each of which are totally incorporated herein by reference.

Suitable liquid crystalline or mesomorphic materials also include polymers that exhibit liquid crystalline behavior. One class of polymers exhibiting liquid crystalline behavior includes polymers having long side chains that exhibit liquid crystalline behavior, such as cholesteric groups, groups with six-membered aliphatic or aromatic rings such as phenyl groups, cyclohexenyl groups, or the like, wherein the flat-sided chains interact in liquid crystalline fashion. The liquid crystalline interactions between the side chains of these polymers are analogous to crosslinking. As the temperature increases, these interactions cease to occur, and the polymeric material changes from a state similar to a crosslinked material to a state analogous to a material with no crosslinking at all as the temperature increases to the mesomorphic transition temperature. The mesomorphic transition results in the viscosity of these polymeric materials undergoing a relatively sharp drop of from about 100,000 to about 10 centipoise over a temperature interval of from about 2° to about 50° C.

Another class of polymers exhibiting liquid crystalline behavior includes polymers wherein the backbone or chain portion exhibits liquid crystalline behavior. Examples of polymers of this type include polyazoxyanisole, various polyesters, and polysiloxanes such as polydiethyl siloxane. In polymeric materials of this type, the repeating units of the polymeric chains attract each other, forming a highly crosslinked composition. Upon heating the material to the mesomorphic transition temperature, the crosslinking interactions are broken, and the viscosity of the material drops sharply, going from about 100,000 to about 10 centipoise over a temperature interval of from about 2° to about 50° C. Some materials of this type, however, tend to have a relatively high viscosity of about 10,000 centipoise even after undergoing the mesomorphic transition, having a consistency comparable to the coatings on adhesive tapes. Accordingly, some materials of this type may be unsuitable for use in multi-use thermal transfer elements. In single use thermal transfer elements, however, materials of this type may be used, as they will become sticky upon heating, and imagewise heating of a transfer element having an ink containing one or more of these materials can result in imagewise transfer of the ink to the receiver sheet by means of the ink adhering to the receiver sheet.

Additional examples of suitable liquid crystalline materials include polybenzamides, such as that of the formula

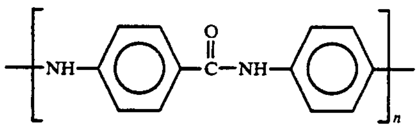

wherein n represents the number of repeating units, as disclosed in, for example, P. W. Morgan, *Polymer Preprints,* 17:47 (1976), E. T. Samulski in *Liquid Crystalline Order in Polymers,* A. Blumstein, ed., Academic Press, New York (1978), and E. Lizuka, *Adv. Polym. Sci.,* 20:79 (1976), the disclosures of each of which are totally incorporated herein by reference; polybenzyl-γ-L-glutamate of the formula

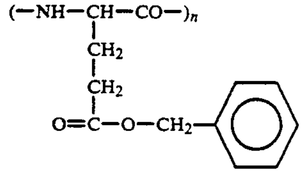

wherein n represents the number of repeating units, as disclosed in, for example, G. W. Gray, *Molecular Structure and the Properties of Liquid Crystals,* Academic, New York (1962) and J. M. Stein, "Molecular Associations in Biological and Related Systems", *Advances in Chemistry Series,* No. 84, American Chemical Society, Washington, D.C. (1969), the disclosures of each of which are totally incorporated herein by reference; poly(biphenyl acrylates), as disclosed in, for example, M. Baccaredda et al., *Polym. Lett.,* 9:303 (1971), B. A. Newman et al., *Adv. Polym. Sci. Eng. Proc. Symp.,* 21 (1972), and P. L. Magagnini et al., *Eur. Polym. J.,* 10:585 (1974), the disclosures of each of which are totally incorporated herein by reference; liquid crystalline polycarbonates of the formula $$(-O-(Ar_1)-O-\overset{O}{\overset{\|}{C}}-O-R-O-\overset{O}{\overset{\|}{C}}-)_x$$

wherein $Ar_1$ is selected from the group consisting of

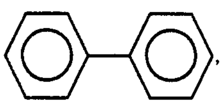

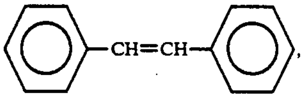

-continued

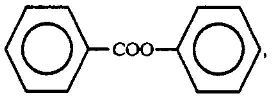

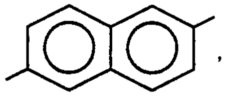

, and

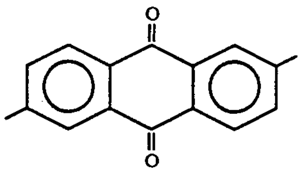

and R is selected from the group consisting of $(CH_2)_n$ $-(CH_2)_2-O-(CH_2)_2)-$ and $-(CH_2)_2-O-(CH_2)_2-O-(CH_2)_2)-$ with n being a number of from about 4 to about 12 and x representing the number of repeating units, generally being from about 5 to about 1,000, as disclosed in U.S. Pat. No. 4,543,313, the disclosure of which is totally incorporated herein by reference; liquid crystalline copolycarbonates of the formula $$(-O-Ar_1-O-\overset{O}{\overset{\|}{C}}-O-R-O-\overset{O}{\overset{\|}{C}})_x-(O-Ar_2-O-\overset{O}{\overset{\|}{C}}-O-R-O-\overset{O}{\overset{\|}{C}}-)_y$$

wherein $Ar_1$ is selected from the group consisting of

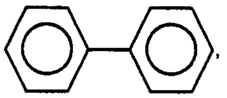

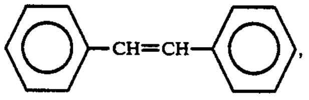

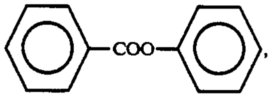

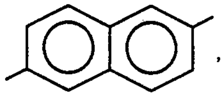

, and

-continued

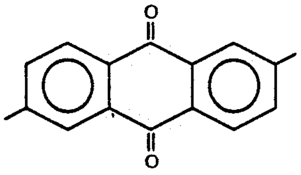

$Ar_2$ is selected from the group consisting of

, 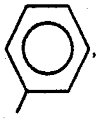,

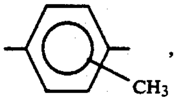, 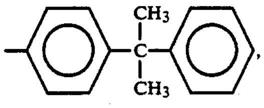, and

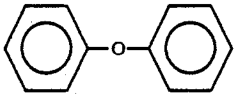

and R is selected from the group consisting of $(CH_2)_n$ $-(CH_2)_2-O-(CH_2)_2-$ and $-(CH_2)_2-O-(CH_2)_2-O-(CH_2)_2-$ with n being a number of from about 4 to about 12 and x and y representing the number of repeating units, generally each being from about 5 to about 1,000, as disclosed in U.S. Pat. No. 4,543,313; liquid crystalline polyurethanes of formula $$(-NH-Ar_1-NH-\overset{\overset{O}{\|}}{C}-O-R-O-\overset{\overset{O}{\|}}{C}-)_x$$

wherein $Ar_1$ is selected from the group consisting of

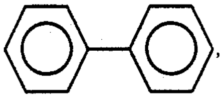,

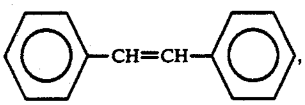,

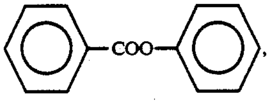,

-continued

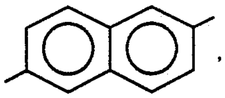, and

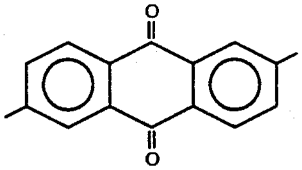

and R is selected from the group consisting of $(CH_2)_n$ $-(CH_2)_2-O-(CH_2)_2-$ and $-(CH_2)_2-O-(CH_2)_2-O-(CH_2)_2-$ with n being a number of from about 4 to about 12 and x representing the number of repeating units, generally being from about 5 to about 1,000, as disclosed in U.S. Pat. No. 4,543,313; liquid crystalline polyesters of the formula $$(-O-Ar_1-O-\overset{\overset{O}{\|}}{C}-R-\overset{\overset{O}{\|}}{C}-)_x$$

wherein $Ar_1$ is selected from the group consisting of

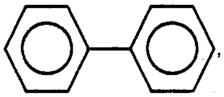,

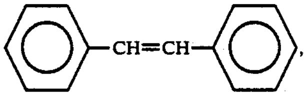,

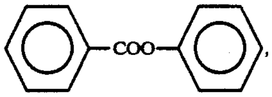,

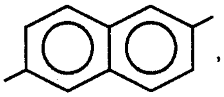, and

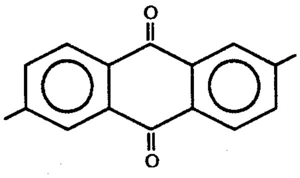

and R is selected from the group consisting of $(CH_2)_n$ $-(CH_2)_2-O-(CH_2)_2)-$ and $-(CH_2)_2-O-(CH_2)_2-O-(CH_2)_2)-$ with n being a number of from about 4 to about 12 and x representing the number of repeating units, generally being from about 5 to about 1,000, as disclosed in U.S. Pat. No. 4,543,313; liquid crystalline copolyesters of the formula $$(-O-Ar_1-O-\overset{\overset{O}{\|}}{C}-R-\overset{\overset{O}{\|}}{C})_x-(O-Ar_2-O-\overset{\overset{O}{\|}}{C}-R-\overset{\overset{O}{\|}}{C}-)_y$$

wherein $Ar_1$ is selected from the group consisting of

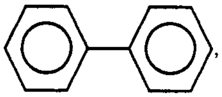

,

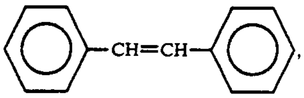

,

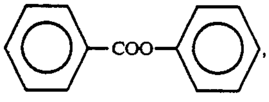

,

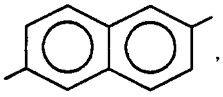

, and

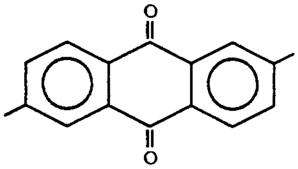

$Ar_2$ is selected from the group consisting of

,

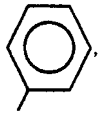

,

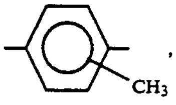

,

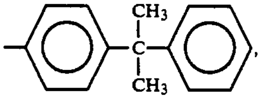

, and

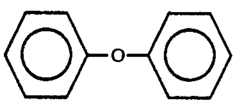

and R is selected from the group consisting of $(CH_2)_n$ $-(CH_2)_2-O-(CH_2)_2)-$ and $-(CH_2)_2-O-(CH_2)_2-O-(CH_2)_2)-$ with n being a number of from about 4 to about 12 and x and y representing the number of repeating units, generally each being from about 5 to about 1,000, as disclosed in U.S. Pat. No. 4,543,313; and liquid crystalline materials as disclosed in U.S. Pat. No. 4,617,371, U.S. Pat. No. 4,729,847, U.S. Pat. No. 4,774,160, U.S. Pat. No. 3,907,559, U.S. Pat. No. 3,732,119, and U.S. Pat. No. 4,394,498, the disclosures of which are totally incorporated herein by reference. Liquid crystalline polymers and processes for the preparation thereof are also disclosed in copending application U.S. Ser. No. 07/315,664, copending application U.S. Ser. No. 07/043,265, copending application U.S. Ser. No. 07/369,797, and copending application U.S. Ser. No. 07/252,472, the disclosure of each of which are totally incorporated herein by reference.

The ink composition contains the mesomorphic material in an effective amount, generally from about 10 to about 75 percent by weight, and preferably from about 10 to about 40 percent by weight. The ink may also contain a diluent in an effective amount, generally from 1 to about 90 percent by weight. The amount of the mesomorphic or liquid crystalline material chosen generally depends on the compatibility of the mesomorphic material with the selected dye or pigment, wherein compatibility refers to how well a selected dye may be dissolved in the material or how well a selected pigment may be suspended in the material. In addition, since mesomorphic materials are often expensive, the mesomorphic component of the inks of the present invention may be diluted with similar molecules, such as fatty acids containing up to about 20 carbon atoms and preferably being saturated. Also suitable as diluents are unsaturated alcohols, glycols, esters of fatty acids, unsaturated fatty acids, and other similar materials having long carbon chains, to enhance compatibility with the liquid crystalline materials, and some degree of polarity, such as that provided by an —OH or —OR group to improve solubility of the diluent in the mesomorphic material. Waxes are also suitable diluent materials, and include materials such as carnauba wax, paraffin waxes, polyethylene waxes, polypropylene waxes, ester waxes such as beeswax, ethylene vinyl acetate copolymers such as Elvax® 410 available from E. I. DuPont de Nemours & Company, and the like as well as mixtures thereof.

The colorant, such as a pigment, a dye, or combinations thereof, is present in the mesomorphic ink in an effective amount, generally from about 2 to about 25 percent by weight, and preferably from about 3 to about 10 percent by weight. Suitable pigments or dyes include carbon black, nigrosine dye, aniline blue, magnetites and mixtures thereof. When the pigment particles are magnetites, which comprise a mixture of iron oxides ($Fe_2O_3.Fe_3O_4$) such as those commercially available as Mapico Black, these pigments are generally present in the ink composition in an amount of from about 2 percent by weight to about 30 percent by weight, although amounts outside of this range may be present provided that the objectives of the present invention are achieved. If magnetite is present in amounts of from about 2 to about 30 percent by weight, the images formed as a result of the thermal transfer printing process employing inks of the present invention can be used for applications wherein magnetically readable images are desirable, such as magnetically readable bar codes and magnetically encoded checks.

The diluent component of the mesomorphic ink compositions for the transfer elements of the present invention can also contain an optional anti-oxidant component, such as BHA or BHT or other known free radical scavenger materials, present in an effective amount, generally from 0.01 to about 0.5 percent by weight, and preferably from about 0.02 to about 0.5 percent by weight. In addition, the diluent component of the ink compositions of the present invention can contain an optional additive to prevent image smudging, such as a glycol, including polyethylene glycol, or polyethylene oxide, present in an effective amount, generally from about 10 to about 88 percent by weight of the ink. When the ink includes a pigment colorant, a dispersant such as a surfactant can also be included in an effective amount, generally from about 0.5 to about 5 percent by weight. Suitable dispersants include known dispersing agents such as Sulfonated Hydrocarbon - Petronate #9, available from Witco Chemical Company, Petrolite WB14, available from Bareco Div. of Petrolite Corporation, and the like.

An ink composition of this type suitable for multi-use applications can be prepared by blending all of the ingredients together at room temperature in the selected ink solvent for about 2 hours in an attritor, a ball mill, or a high shear mixer, followed by mixing the solution with the other solution containing the sponge polymer, as described herein. Inks of this type require less heat to induce the phase change than inks of the other classifications, and thus provide advantages in the thermal transfer printing process, such as enablement of faster printing and lowering of energy requirements. Potential disadvantages of these inks when employed in single use thermal transfer elements, such as offsetting, blocking in a wound roll, and other handling problems, are circumvented by the porous sponge structure of the present invention.

The ink compositions present in the multi-use transfer elements contain a colorant, which can be a dye, a pigment, or a mixture of one or more dyes and/or one or more pigments. Colorants are present in effective amounts, generally from about 2 to about 25 percent by weight of the ink. Various pigments and dyes are suitable for the ink. Examples of suitable pigments and dyes include carbon black, nigrosine dye, aniline blue, 2,9-dimethyl-substituted quinacridone and anthraquinone dye, identified in the Color Index as Cl 60710, Cl Dispersed Red 15, a diazo dye identified in the Color Index as Cl 26050, cl Solvent Red 19, copper tetra-4-(octadecyl sulfonamido) phthalocyanine, copper phthalocyanine pigment, listed in the Color Index as Cl 74160, Pigment Blue, and Anthradanthrene Blue, identified in the Color Index as Cl 69810, Special Blue X-2137, diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4′-chloro-2,5-dimethoxy acetoacetanilide, Permanent Yellow FGL, Normandy Magenta RD-2400 (Paul Uhlich), Paliogen Violet 5100 (BASF), Paliogen violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Lithol Rubine D4566 (Lake)(-BASF), Heliogen Blue NB D7010 (BASF), and Sico Yellow NB D 1360 (BASF).

Ink compositions selected for multi-use thermal transfer elements preferably have a high concentration of colorant present, so that a small amount of the ink is sufficient to form an image of desired optical density. High colorant content in inks is often difficult to achieve because of the relatively low solubility of dyes in ink vehicles and the high viscosities associated with inks having high pigment loadings. Reactive dyes or basic dyes (those with a pH of over 7.0) that have been reacted with fatty acids to form dye salts, however, tend to exhibit significantly higher solubilities in ink vehicles than unreacted dyes. For example, reactive dyes or basic dyes unreacted with fatty acids typically exhibit solubilities of from about 1 to about 4 percent by weight in typical solvents or liquid vehicles, enabling ink compositions having the dye present in amounts of from about 0.3 to about 2 percent by weight. These same dyes, however, when reacted with a fatty acid such as oleic acid, stearic acid, palmitic acid, myristic acid, or linoleic acid, typically exhibit solubilities of from about 20 to about 50 percent by weight in the liquid vehicle or solvent, enabling ink compositions having the dye present in amounts of from about 5 to about 15 percent by weight. Dye salts of fatty acids are highly colored and exhibit excellent brightness and enable prints with unusually high print densities. In addition, inks containing dye salts of fatty acids exhibit excellent spreading and fixing qualities on receiver sheets, reduced susceptibility to thermally induced sublimation, and good transparency, which makes them suitable for printing on transparency material and for the formation of process color images. Suitable dyes for reaction with a fatty acid include the class of dyes known as reactive dyes and basic dyes with a pH of over 7.0. Particularly preferred are dyes such as Neptun Base Red 486 (BASF), Neptun Base Blue NB652 (BASF), Baso Yellow 124 (BASF), Neptun X60 (BASF), and the like. Dye salts of fatty acids can also be included in ink compositions in combination with other dyes and/or pigments.

Solid inks can be prepared by reacting one of the dyes listed above with a saturated fatty acid having from about 12 to about 50 carbon atoms, such as palmitic acid with 16 carbon atoms or stearic acid with 18 carbon atoms. Liquid inks can be prepared reacting one of the dyes listed above with an unsaturated fatty acid with from about 12 to about 30 carbon atoms, such as oleic acid with 18 carbon atoms and palmitoleic acid with 16 carbon atoms, and semisolid inks can be prepared by reacting one of the above dyes with a mixture of saturated and unsaturated fatty acids, wherein the ratio of saturated to unsaturated acid can vary from 0 percent saturated and 100 percent unsaturated to 100 percent saturated and 0 percent unsaturated. Inks containing these dye salts can be prepared by mixing the ingredients at from about 70° C. to about 95° C. and stirring. When liquid crystalline components are present in the inks, the inks containing the dye salts generally can be prepared by mixing the ingredients at room temperature, when liquid dye salts are present, or at about 70° C., when semisolid or solid dye salts are present.

The porous ink-filled layer of the thermal transfer elements of the present invention can be prepared by many methods. For example, a two solvent process can be employed, which process entails dissolving the polymeric sponge material in one solvent and the ink in another solvent These solvents are chosen to be miscible with each other, and chosen so that the ink does not exhibit substantial solubility in the sponge solvent, and the sponge material does not exhibit substantial solubility in the ink solvent. The ink solvent is generally capable of evaporating at a lower temperature than the sponge solvent or has a lower boiling point than the sponge solvent at any given atmospheric pressure. A mixture is prepared by mixing a solution of the sponge material in its selected solvent with a solution of the ink in its selected solvent, with the sponge material and ink being present in relative amounts proportional to the ratio of ink to sponge desired in the coating. The mixture is then coated onto the substrate. Upon application of heat to the mixture, generally at a temperature equal to or greater than the boiling point of the ink solvent but lower than the boiling point of the sponge solvent, the ink solvent evaporates first, leaving ink droplets dispersed throughout the matrix of the sponge material in its solvent. Subsequently, the mixture is heated to a higher temperature, and the sponge solvent evaporates, which causes the polymeric sponge material to precipitate and form a solid structure around the ink droplets, resulting in a sponge containing ink droplets dispersed therein and adhering to the substrate.

Another suitable method of preparing the porous ink-filled layer is by ultraviolet polymerization of a multiphase system. An emulsion is prepared which comprises the ink composition and a monomer. This emulsion is coated onto the substrate, and the coated substrate is then exposed to ultraviolet light, which polymerizes the monomer in the emulsion, forming the polymeric sponge around the ink droplets.

A third method for preparing the porous ink-filled layer is by preparing a solution of the polymer sponge in a solvent and suspending in the solution a leachable material, such as a salt. The suspension is coated onto the substrate, and the solvent is evaporated, causing the polymeric material to precipitate and form a sponge material having the solid leachable material embedded therein. Subsequently, the sponge and substrate are soaked in water or another suitable material, causing the leachable material to leach from the sponge, leaving pores in the sponge where the solid particles once were. An inking operation can then be employed to place the ink composition into the pores. Such a process could comprise, for example, hot roll coating of the ink onto the sponge layer, followed by heating the transfer element to allow the ink to absorb into the sponge by capillary action.

Still another suitable process for preparing the porous ink-filled layer is to prepare a suspension of the polymeric sponge material in a solvent and suspending in the solution a liquid or solid blowing agent that will become gaseous upon heating to a temperature higher than that required to evaporate the solvent. The suspension is coated onto the substrate, and the solvent is evaporated causing the polymeric material to precipitate and form a sponge material around the droplets or particles of the blowing material. Subsequent heating of the sponge and substrate causes the blowing agent to become gaseous, which "blows up" the sponge, forming pores therein. An inking operation, such as hot roll coating followed by heating, can then be employed to inject or apply the ink composition into the pores.

Pore size in the porous layer affects the rate at which ink will be released from the multi-use transfer element; smaller pores result in a transfer element from which the ink is released more slowly. The size of the pores is chosen according to the ink composition to be employed since variables such as ink viscosity also affect the rate at which ink will be released from the transfer element. Generally, the rate of release should be as low as possible, while still enabling images of the desired quality, in order to conserve ink and permit the maximum number of uses of the transfer element. In general, the pore size ranges from about 0.5 to about 30 microns in average diameter, and preferably is from about 2 to about 5 microns in average diameter.

Pore size can be controlled by varying the ratio of the ink solvent to the sponge solvent in the two solvent coating process. Raising the amount of sponge solvent with respect to the amount of ink solvent results in the formation of smaller pores. For example, an ink-filled sponge can be prepared by the two solvent approach, wherein methyl ethyl ketone is the sponge solvent and toluene is the ink solvent. The ratio of methyl ethyl ketone can be varied from 50:50 to 60:40 to enable a sponge having smaller pores; by maintaining the ink to polymer ratio constant and adding more methyl ethyl ketone, the resulting pore size can be reduced. Adjusting the solids content within the solvents during the two solvent coating process also affects pore size. Generally, the solid materials are present in the solvent in an amount of about 25 percent by weight; raising the solids content in the solvents to about 50 percent by weight results in formation of smaller pores. In addition, the rate of evaporation of the solvents can affect pore size in that faster evaporation leads to larger pores. The rate of evaporation can be controlled by controlling the temperature and air flow during solvent evaporation, wherein faster air flow and/or higher temperature lead to faster evaporation. When the sponge is prepared by ultraviolet polymerization of a multiphase system, pore size can be adjusted by selection of the surfactant that emulsifies the ink so that the ink droplets are of the desired size. For example, increasing the amount of surfactant present will increase the surface area between the ink and the sponge monomers, thereby leading to smaller ink droplets and smaller pores. When the sponge is prepared by leaching or blowing, the leaching or blowing agent can be selected to provide pores of the desired size. For example, large particles of the leaching agent or blowing agent will lead to large pores, whereas finely divided leaching or blowing agents will lead to small pores.

Regulation of ink release is particularly important in full color thermal transfer printing applications, where the amount of each colored ink released affects the color on the receiver sheet. In addition, pore size affects edge acuity of the image in that large pores could result in an image having a scalloped edge and grainy solid areas. Ink release can also be controlled by regulating the viscosity of the ink in that lower viscosity results in more ink being released. In addition, applying pressure to the transfer element will increase the amount and uniformity of ink released. Further, increasing the amount of ink present in the sponge will result in greater release of ink. Increasing the affinity of the ink for the substrate will also increase ink release; since paper substrates tend to have polar groups on the surface, addition of polar materials such as alcohols, including polyvinyl alcohol, materials such as polyvinyl acetate or polyethylene oxide, and similar polar materials will increase the ink's affinity for the paper and promote ink release.

Thermal transfer elements of the present invention are particularly suitable for multiple uses since, unlike a single use transfer element for which all of the ink at a given area of the transfer element is used to form an image, the multi-use transfer element releases only a controlled amount of ink to form an image. Thus, the ink supply in a given area is not exhausted, and the transfer element can again be used to form images. Thermal transfer elements of the present invention can be used at least 15 times for monochrome applications such as facsimile printing, and can be used at least 5 times for color printing applications. In addition, uniformity of image density is generally observed during the period of multiple usage. With each successive overprint, the transfer element diminishes or collapses, which makes extraction of the ink more difficult. This diminution or collapse, however, also lessens the thickness of the transfer element, which enables more efficient heating and easier transfer of the ink with the same amount of applied heat. These two effects tend to counteract each other, leading to formation of images having substantially uniform density during the period of multiple use.

Thermal transfer printing according to the present invention in which the heating is provided by applying voltages to a resistive substrate has the advantage of higher printing speed than printing processes employing conventional selective heating techniques. In the case of selective resistive heating, printing speed is not limited by thermal relaxation tmes or thermal conduction rates of the styli of the printhead, because a short pulse of electric current locally heats the substrate, and this heat can transfer to the ink layer over times much longer than the time the stylus is in contact with that area of the substrate.

Thermal transfer printing processes employing the multi-use transfer elements of the present invention can be enhanced by providing a heating element behind the receiver sheet. For example, in addition to the printhead in the thermal transfer printing apparatus, an image bar operating behind the paper and providing heat in imagewise fashion will enhance heating of the ink, and can assist in providing images within a gray scale. The heater in the printhead applies heat that passes through the substrate, sponge, and ink portions of the multi-use transfer elements of the present invention to reach the ink nearest to the receiver sheet. Applying additional heat to the surface of the transfer element by heating the receiver sheet from behind causes the ink to be released from the transfer sheet more rapidly, leading to higher image density. By selectively applying heat from the second heater behind the receiver sheet in imagewise fashion, the amount of heat applied to the ink can be modulated, leading to additional control over image density. General heating of the receiver is at a temperature below the threshold of ink transfer in non-image areas, where no energy is being applied by the printhead.

The various methods and materials for producing the multi-use transfer elements disclosed herein can differ in their recovery rates, or ink redistribution times. Those with longer recovery times may be better suited for applications of less frequent use. For example, in some applications the transfer element can be advanced a fraction of a line after each line of characters is printed. In others, the entire transfer element can be used once and then recycled. The latter system would permit ribbons of longer recovery times.

Multi-use thermal transfer elements of the present invention are useful for several applications. For example, they can be incorporated into facsimile machines employing thermal transfer printing processes, such as the Xerox® 7020, the Xerox® 7021, and the Xerox® 7035, available from Xerox Corporation. These machines can be employed in the form in which they are supplied by the manufacturer, or they can be improved for printing according to the present invention by increasing the pressure between the transfer element and the paper by means such as a spring loaded backing roll. In addition, the transfer elements can be incorporated into machines that employ thermal transfer printing to form full color images, such as the Versaplotter®, available from Versatec Corporation. In order to obtain multiple uses of the transfer element automatically, the printing apparatus should preferably be equipped with a mechanism either to rewind the transfer element or to run the transfer element through the machine in the opposite direction.

The following examples are illustrative in nature and are not intended to limit the scope of the invention. Other embodiments can occur to those skilled in the art. Parts and percentages are by weight unless otherwise indicated.

EXAMPLE I

A magenta dye salt was prepared by melting 20 grams of stearic acid, triple pressed and consisting of approximately 50 percent by weight of $C_{16}$ acids and 50 percent by weight of $C_{18}$ acids, available from Baker Chemical Company, and heating the acid to 95° C. To the melted stearic acid was then slowly added 20 grams of a xanthene dye of the formula $(C_{28}H_{30}N_2O_3)^{\oplus}Cl^{\ominus}$, molecular weight 478, available from BASF Company as Neptun Base Red 486. An evolving gas caused a foaming action indicating a reaction. The mixture was maintained at 95° C. for 10 minutes as the reaction proceeded to completion, after which the hot dye salt was cooled in air to a waxy substance. The resulting solid product was deep red in color and exhibited a sharp melting point at about 55° C. A film formed as the melted product wetted the side of the beaker was observed to be bright and clear.

EXAMPLE II

A magenta dye salt was prepared by melting 20 grams of oleic acid No. 221, available from Emery Chemical Company, and heating the acid to 95° C. To the melted stearic acid was then slowly added 20 grams of a xanthene dye of the formula $(C_{28}H_{30}N_2O_3)^{\oplus}Cl^{\ominus}$, molecular weight 478, available from BASF Company as Neptun Base Red 486. An evolving gas caused a foaming action indicating a reaction. The mixture was maintained at 95° C. for 10 minutes as the reaction proceeded to completion, after which the hot dye salt was cooled in air to a waxy substance. The resulting solid product was deep red in color and exhibited a sharp melting point at about 55° C. A film formed as the melted product wetted the side of the beaker was observed to be bright and clear.

EXAMPLE III

A cyan dye salt was prepared by melting 20 grams of stearic acid, triple pressed and consisting of approximately 50 percent by weight of $C_{16}$ acids and 50 percent by weight of $C_{18}$ acids, available from Baker Chemical Company, and heating the acid to 95° C. To the melted stearic acid was then slowly added 20 grams of a triphenyl arilide dye of the formula $(C_{16}H_{30}O_2).ClH$, molecular weight 515, available from BASF Company as Neptun Base Blue NB652. An evolving gas caused a foaming action indicating a reaction. The mixture was maintained at 95° C. for 10 minutes as the reaction proceeded to completion, during which time a color change from dull brown to slightly red-tinged blue was noted. A cyan color was achieved by adding to the melted mixture 0.2 gram of a yellow dye, Baso Yellow 124, available from BASF Company, after which the hot dye salt was cooled in air to a waxy substance. The resulting solid product was cyan in color and exhibited a sharp melting point at about 65° C. A film formed as the melted product wetted the side of the beaker was observed to be bright and clear.

EXAMPLE IV

A yellow dye salt was prepared by melting 40 grams of stearic acid, triple pressed and consisting of approximately 50 percent by weight of $C_{16}$ acids and 50 percent by weight of $C_{18}$ acids, available from Baker Chemical Company, and heating the acid to 95° C. To the melted stearic acid was then slowly added 20 grams of a diarylmethane dye of the formula $C_{17}H_{21}N_3$, molecular weight 267, available from BASF Company as Baso Yellow 124. The mixture was maintained at 95° C. for 10 minutes as the reaction proceeded to completion, after which the hot dye salt was cooled in air to a waxy substance. The resulting solid product was yellow in color and exhibited a sharp melting point at about 65° C. A film formed as the melted product wetted the side of the beaker was observed to be bright and clear.

EXAMPLE V

A black dye salt was prepared by melting 60 grams of stearic acid, triple pressed and consisting of approximately 50 percent by weight of $C_{16}$ acids and 50 percent by weight of $C_{18}$ acids, available from Baker Chemical Company, and heating the acid to 95° C. To the melted stearic acid was then slowly added 20 grams of a diarylmethane dye of the formula $C_{17}H_{21}N_3$, molecular weight 267, available from BASF Company as Baso Yellow 124, and 7.5 grams of a triphenyl arilide dye of the formula $(C_{16}H_{30}O_2).ClH$, molecular weight 515, available from BASF Company as Neptun Base Blue NB652, forming a dark green mixture. To the molten mixture was then added 2.5 grams of a xanthene dye of the formula $(C_{28}H_{30}N_2O_3)^{\oplus}Cl^{\ominus}$, molecular weight 478, available from BASF Company as Neptun Base Red 486, which resulted in the mixture turning black. An evolving gas caused a foaming action indicating a reaction. The mixture was maintained at 95° C. for 10 minutes as the reaction proceeded to completion, after which the hot dye salt was cooled in air to a waxy substance. The resulting solid product was black in color and exhibited a sharp melting point at about 65° C.

EXAMPLE VI

A black dye salt was prepared by melting 40 grams of stearic acid, triple pressed and consisting of approximately 50 percent by weight of $C_{16}$ acids and 50 percent by weight of $C_{18}$ acids, available from Baker Chemical Company, and hating the acid to 95° C. To the melted stearic acid was then slowly added 20 grams of a black diazo dye, C.I. 26150 molecular weight 456, available from BASF Company as Neptun X60. An evolving gas caused a foaming action indicating a reaction. The mixture was maintained at 95° C. for 10 minutes as the reaction proceeded to completion, after which the hot dye salt was cooled in air to a waxy substance. The resulting solid product was black in color and exhibited a sharp melting point at about 65° C.

EXAMPLE VII

A magenta ink composition was prepared by mixing 62 grams of white refined beeswax, available from International Wax Company, 5 grams of Carnauba Wax No. 1, available from Strahl & Pitsch Company, and 23 grams of a magenta dye stearate prepared according to the method of Example I. The waxes and dye salt were co-melted and mixed at 80° C., after which 9 grams of a magenta pigment, Lithol Rubine D4566 (Lake), available from BASF Company, was added to the melt, which was continued to be mixed. To 200 grams of a toluene solvent at 22° C. was then added 1 gram of a dispersant, Sulfonated Hydrocarbon - Petronate #9, available from Witco Chemical Company, until the dispersant dissolved in the solvent, after which the solution was cooled to room temperature. The molten wax, dye salt, and pigment mixture was then added to the toluene-dispersant solution, and the resulting mixture was rapidly shaken and then milled on a ball mill using stainless steel shot for 8 hours. The resulting ink composition was solid at room temperature and exhibited a sharp melting point at 60° c., at which temperature the melted ink exhibited a viscosity of 4 centipoise.

EXAMPLE VIII

A cyan ink composition was prepared by mixing 36 grams of white refined beeswax, available from International Wax Company, 5 grams of Carnauba Wax No. 1, available from Strahl & Pitsch Company, and 23 grams of a cyan dye stearate prepared according to the method of Example III. The waxes and dye salt were co-melted and mixed at 80° C., after which 9 grams of a cyan pigment, Heliogen Blue NB D 7010, available from BASF Company, was added to the melt, which was continued to be mixed. To 200 grams of a toluene solvent at about 40° C. was then added 1 gram of a dispersant, Sulfonated Hydrocarbon - Petronate #9, available from Witco Chemical Company, until the dispersant dissolved in the solvent, after which the solution was cooled to room temperature. The molten wax, dye salt, and pigment mixture was then added to the toluene-dispersant solution, and the resulting mixture was rapidly shaken and then milled on a ball mill using stainless steel shot for 8 hours. The resulting ink composition was solid at room temperature and exhibited a sharp melting point at 65° C., at which temperature the melted ink exhibited a viscosity of 4 centipoise.

EXAMPLE IX

A yellow ink composition was prepared by mixing 62 grams of white refined beeswax, available from International Wax Company, 5 grams of Carnauba Wax No. 1, available from Strahl & Pitsch Company, and 23 grams of a yellow dye stearate prepared according to the method of Example IV. The waxes and dye salt were co-melted and mixed at 80° C., after which 9 grams of a yellow pigment, Sico Yellow NB D 1360, available from BASF Company, was added to the melt, which was continued to be mixed. To 200 grams of a toluene solvent at about 40° C. was then added 1 gram of a dispersant, Sulfonated Hydrocarbon - Petronate #9, available from Witco Chemical Company, until the dispersant dissolved in the solvent, after which the solution was cooled to room temperature. The molten wax, dye salt, and pigment mixture was then added to the toluene-dispersant solution, and the resulting mixture was rapidly shaken and then milled on a ball mill using stainless steel shot for 8 hours. The resulting ink composition was solid at room temperature and exhibited a sharp melting point at 65° C., at which temperature the melted ink exhibited a viscosity of 4 centipoise.

EXAMPLE X

Ink compositions were prepared according to the methods of Examples VII, VIII, and IX. Each ink was mixed with a solution comprising 20 percent by weight of polyvinyl chloride-polyvinyl acetate random copolymer and 80 percent by weight of methyl ethyl ketone (MEK). Additional amounts of toluene and MEK were then added to each solution to produce solutions having solids contents of about 20 percent by weight, ratios of 50 percent MEK to 50 percent toluene, and ink to polymer ratios of 2 to 1. The solutions were each coated onto Mylar® 30T polyester substrates in dry thicknesses of 20 microns (0.8 mil) and dried in two stages, at room temperature for 1 minute and at 95° C. for 2 minutes. Scanning Electron Microscopy confirmed that micro-sponge structures were formed, in which ink was trapped in an open cell polymer matrix. The resulting transfer sheets were spliced into the web of a Diablo® EPM thermal transfer printer, available from Xerox Corporation, and each was printed 10 times with a block test pattern. Five prints of good quality and no background deposits were formed on Xerox® 4024 paper by each transfer sheet; image density was observed to decrease with the sixth and subsequent prints formed by each of the sheets.

EXAMPLE XI

Transfer sheets prepared according to the method of Example X and containing the inks of Examples VII, VIII, and IX were prepared. The resulting transfer sheets were spliced into the web of a Diablo EPM API and process color images were formed on Xerox® 4024 paper by over printing blocks of cyan, magenta, and yellow to yield blocks of red (yellow+magenta), green (yellow+cyan), blue (red+cyan), and black (yellow+magenta+cyan). The high colorant content of the inks resulted in images that were relatively flat or planar, as opposed to being noticeably raised from the paper.

EXAMPLE XII

A magenta ink composition is prepared by mixing 72 parts by weight of white refined beeswax, available from International Wax Company, 10 parts by weight of Carnauba Wax No. 1, available from Strahl & Pitsch Company, and 18 parts by weight of a magenta pigment, Lithol Rubine D4566 (Lake), available from BASF Company. The waxes are co-melted and mixed at 80° C., after which the pigment is added to the melt, which is continued to be mixed. To 200 parts by weight of a toluene solvent at 22° C. is then added 1 part by weight of a dispersant, Sulfonated Hydrocarbon - Petronate #9, available from Witco Chemical Company, until the dispersant dissolves in the solvent, after which the solution is cooled to room temperature. The molten wax and pigment mixture is then added to the toluene-dispersant solution, and the resulting mixture is rapidly shaken and then milled on a ball mill using stainless steel shot for about 8 hours. The resulting ink composition is solid at room temperature.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto Mylar® 23T polyester substrate in a dry thickness of about 20 microns (0.8 mil) and dried in two stages, at room temperature for 1 minute and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

EXAMPLE XIII

A black ink composition is prepared by mixing 88 parts by weight of polyethylene glycol and 12 parts by weight of Neptun X60 black dye (BASF) at a temperature of about 60° C. to obtain a uniform mixture. To 200 parts by weight of a toluene solvent at 22° C. is then added 1 part by weight of a dispersant, Sulfonated Hydrocarbon - Petronate #9, available from Witco Chemical Company, until the dispersant dissolves in the solvent, after which the solution is cooled to room temperature. The glycol and dye mixture is then added to the toluene-dispersant solution, and the resulting mixture is rapidly shaken and then milled on a ball mill using stainless steel shot for about 8 hours. The resulting ink composition is liquid at room temperature.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto a Mylar® 23T polyester substrate in a dry thickness of about 20 microns (0.8 mils) and dried in two stages, at room temperature for 1 minute and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

EXAMPLE XIV

A magenta ink composition is prepared by mixing 85 parts by weight of a chlorinated polyethylene polymer available from Eastman Kodak Company as Epolene C-16, 7 parts by weight of Neptun Base Red 486 magenta dye (BASF), and 8 parts by weight of Lithol Rubine D4566 (Lake) magenta pigment (BASF). The Epolene C-16 is heated to its melting temperature and then admixed with the dye and pigment, and the mixture is stirred to obtain a uniform mixture. To 200 parts by weight of a toluene solvent at 22° C. is then added 1 part by weight of a dispersant, Sulfonated Hydrocarbon - Petronate #9, available from Witco Chemical Company, until the dispersant dissolves in the solvent, after which the solution is cooled to room temperature. The chlorinated polyethylene, pigment, and dye mixture is then added to the toluene-dispersant solution, and the resulting mixture is rapidly shaken and then milled on a ball mill using stainless steel shot for about 8 hours. The resulting ink composition is solid at room temperature.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto a Mylar® 23T polyester substrate in a dry thickness of about 20 microns (0.8 mil) and dried in two stages, at room temperature for 1 minute and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

EXAMPLE XV

A magenta ink composition is prepared by mixing 75 parts by weight of a polyester of the formula

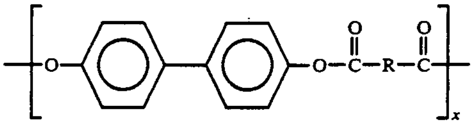

wherein R is the group $(CH_2)_7$ and x is the number of repeating units prepared according to the method set forth in Example V of U.S. Pat. No. 4,543,313, the disclosure of which is totally incorporated herein by reference, and 25 parts by weight of a magenta pigment, Lithol Rubine D4566 (Lake), available from BASF Company. The liquid crystalline polymer is heated to about 250° C., after which the pigment is added to the melt, which is continued to be mixed. To 200 parts by weight of a toluene solvent at 22° C. is then added 1 part by weight of a dispersant, Sulfonated Hydrocarbon - Petronate #9, available from Witco Chemical Company, until the dispersant dissolves in the solvent, after which the solution is cooled to room temperature. The molten liquid crystalline polymer and pigment mixture is then added to the toluene-dispersant solution, and the resulting mixture is rapidly shaken and then milled on a ball mill using stainless steel shot for about 8 hours. The resulting ink composition is solid at room temperature.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto a Mylar® 23T polyester substrate in a dry thickness of about 20 microns (0.8 mil) and dried in two stages, at room temperature for 1 minute and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

EXAMPLE XVI

A black ink composition is prepared by mixing 10 parts by weight of a liquid crystalline copolycarbonate polymer of the formula

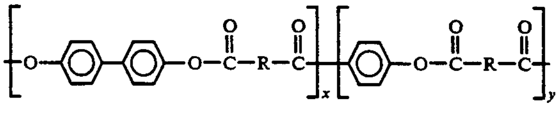

wherein R is a diethylene glycol and x and y represent the fractions of the two repeating units in the copolymer prepared according to the method set forth in Example II of U.S. Pat. No. 4,543,313, 75 parts by weight of polyethylene glycol, and 15 parts by weight of Neptun X60 black dye (BASF) at a temperature of about 170° C. to obtain a uniform mixture. To 200 parts by weight of a toluene solvent at 22° C. is then added 1 part by weight of a dispersant, Sulfonated Hydrocarbon - Petronate #9, available from Witco Chemical Company, until the dispersant dissolves in the solvent, after which the solution is cooled to room temperature. The liquid crystalline polymer, glycol, and dye mixture is then added to the toluene-dispersant solution, and the resulting mixture is rapidly shaken and then milled on a ball mill using stainless steel shot for about 8 hours. The resulting ink composition is liquid at room temperature.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto a Mylar® 23T polyester substrate in a dry thickness of about 20 microns (0.8 mil) and dried in two stages, at room temperature for 1 minute and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

EXAMPLE XVII

A magenta ink composition is prepared by heating and mixing together 40 parts by weight of hexyl azoxyanisole, 35 parts by weight of white refined beeswax, available from International Wax Company, 10 parts by weight of Carnauba Wax No. 1, available from Strahl & Pitsch Company, and 15 parts by weight of a magenta pigment, Lithol Rubine D4566 (Lake), available from BASF Company until a uniform molten mixture of the materials is obtained.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto a Mylar® 23T polyester substrate in a dry thickness of about 20 microns (0.8 mil) and dried in two stages, at room temperature for 1 minute and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

EXAMPLE XVIII

A black ink composition is prepared by heating and mixing together 75 parts by weight of diethyl azoxyanisole and 25 parts by weight of Neptun X60 black dye (BASF) until a uniform molten mixture of the materials is obtained.

The ink thus prepared is mixed with a solution comprising 20 percent by weight of polyvinyl chloride-polyvinyl acetate random copolymer and 80 percent by weight of methyl ethyl ketone (MEK). Additional amounts of toluene and MEK are then added to the solution to produce a solution having a solids content of about 20 percent by weight, a ratio of about 50 percent MEK to 50 percent toluene, and an ink to polymer ratio of about 2 to 1. The solution is coated onto a Mylar® 23T polyester substrate in a dry thickness of about 20 microns (0.8 mil) and dried in two stages, at room temperature for 1 minutes and at 95° C. for 2 minutes. The resulting transfer sheet can then be spliced into the web of a Diablo® EPM thermal transfer printer, available from Xerox Corporation, and printed 10 times with a block test pattern. It is believed that at least five prints of good quality and no background deposits can be formed on Xerox® 4024 paper by the transfer sheet thus formed.

The above examples are illustrative in nature, and the invention is not limited to the specific embodiments. Those skilled in the art will recognize variations and modifications that can be made which are within the scope of the following claims.

We claim:

1. A process for forming images which comprises the steps of:

a. incorporating into a thermal transfer printing apparatus a multi-use thermal transfer element comprising a substrate upon which is situated a porous sponge layer filled with ink, said porous sponge layer comprising a material selected from a group consisting of copolymers of polyvinyl chloride, copolymers of polyvinyl acetate, polyesters, silicone polymers, polycarbonates, polysulfones, poly phenylene oxides, block copolymers of alpha methyl styrene, polyamides, elastomeric materials, urethanes, natural rubbers, synthetic rubbers, and mixtures thereof;

b. applying heat imagewise to a portion of the substrate to heat the ink contained in the porous sponge layer, thereby enabling transfer of the ink in imagewise fashion from the porous sponge layer to a receiver sheet in contact with the porous sponge layer;

c. thereafter separating the receiver sheet of step (b) from the multi-use transfer element, d. subsequently contacting the porous sponge layer situated on the portion of the substrate heated in step (b) with a receiver sheet; and e. thereafter applying heat imagewise to the portion of the substrate previously heated in step (b) to heat the ink contained in the porous sponge layer, thereby enabling transfer of the ink in imagewise fashion from the porous sponge layer to the receiver sheet of step (d).

2. A process according to claim 1 wherein the multi-use transfer element is a ribbon situated between a supply means and a takeup means.

3. A process according to claim 1, wherein the ink is a liquid material having a viscosity of at least about 10 centipoise at room temperature and about 1000 centipoise or less when heated, and wherein the viscosity of the ink is lowered upon heating, thereby enabling the ink to transfer from the porous sponge layer to a receiver sheet.

4. A process according to claim 3 wherein the ink is heated to a temperature of from about 40° C. to about 150° C.

5. A process according to claim 3 wherein the ink comprises a colorant and an ink base selected from a group consisting of vegetable oils, mineral oils, fatty acids, diglycerides, triglycerides, silicone fluids, prolylene carbonate, fatty acid esters, fatty acid amines, glycols, polyglycols, alkanes, alcohols, dimer acids, trimer acids, and mixtures thereof.

6. A process according to claim 5 wherein the colorant is present in an amount of from about 2 to about 25 percent by weight of the ink and the ink base is present in an amount of from about 75 to about 98 percent by weight.

7. A process according to claim 1 wherein the ink is solid at room temperature and liquid when heated, wherein the ink when heated has a viscosity of no more than about 5 poise.

8. A process according to claim 7 wherein the ink is heated to a temperature of from about 40° C. to about 150° C.

9. A process according to claim 7 wherein the ink comprises a colorant and an ink base selected from a group consisting of animal fats, saturated vegetable oils, partly saturated vegetable oils, saturated fatty acids, long chain alcohols, amines of fatty acids, amides of fatty acids, esters of fatty acids, long chain saturated ethers, polyethylene oxide, vegetable waxes, animal waxes, mineral waxes, synthetic waxes, and mixtures thereof.

10. A process according to claim 7 wherein the ink comprises a colorant and an ink base selected from a group consisting of crystalline waxes, saturated long-chain fatty acids with from about 12 to about 50 carbon atoms, saturated long-chain alcohols with from about 12 to about 50 carbon atoms, saturated long-chain esters with from about 12 to about 50 carbon atoms, and mixtures thereof.

11. A process according to claim 10 wherein the colorant is present in an amount of from about 2 to about 25 percent by weight of the ink and the ink base is present in an amount of from about 75 to about 98 percent by weight.

12. A process according to claim 1 wherein the ink undergoes a second order phase change upon being heated, and wherein the second order phase change enables heated portions of the ink to separate from the porous sponge layer and adhere to a receiver sheet.

13. A process according to claim 12 wherein the ink is heated to a temperature of from about 40° C. to about 150° C.

14. A process according to claim 12 wherein the ink comprises a colorant and an ink base selected from a group consisting of rosin based polymers, polyolefins, substituted polyolefins, polyolefin copolymers, polyvinyl acetate copolymers, styrene-butadiene copolymers, styrene acrylate copolymers, styrene methacrylate copolymers, and mixtures thereof.

15. A process according to claim 14 wherein the colorant is present in an amount of from about 2 to about 25 percent by weight of the ink, the ink base is present in an amount of from about 75 to about 98 percent by weight.

16. A process according to claim 1 wherein the ink undergoes a mesomorphic phase change upon being heated, and wherein the mesomorphic phase change enables heated portions of the ink to separate from the porous sponge layer and adhere to a receiver sheet.

17. A process according to claim 16 wherein the ink is heated to a temperature of from about 40° C. and about 150° C.

18. A process according to claim 16 wherein the ink comprises a colorant and an ink base containing a liquid crystalline material.

19. A process according to claim 18 wherein the liquid crystalline material is selected from the group consisting of azoxyanisoles, cholesterol derivatives, 4,4'-di-n-alkoxyazoxybenzenes, p-alkoxybenzoic acids, 4,4'-di-n-alkoxyphenylnitrones, 4-benzylidene-amino-4'-methoxybiphenyls with aromatic or heterocyclic functionalities, Schiff's bases, diphenylacetylides, cholesteryl esters, carbonates, S-alkyl carbonates, benzoates, naphthates, cinnamates, pyrimidines, benzilidene anilines, polybenzamides, polycarbonates, polyurethanes, polyesters, copolyesters, copolycarbonates, and mixtures thereof.

20. A process according to claim 1 wherein the ink contains a dye salt resulting from a reaction between a dye and a fatty acid.

21. A process according to claim 20 wherein the dye salt is present in the ink in an amount of from about 5 to about 80 percent by weight.

22. A process according to claim 20 wherein the dye is selected from a group consisting of reactive dyes and basic dyes.

23. A process according to claim 20 wherein the fatty acid is selected from a group consisting of oleic acid, stearic acid, palmitic acid, myristic acid, and linoleic acid.

24. A process according to claim 1 wherein the porous sponge comprises a material selected from a group consisting of copolymers of polyvinyl chloride, copolymers of polyvinyl acetate, polyesters, silicone polymers, polycarbonates, polysulfones, poly phenylene oxides, block copolymers of alpha methyl styrene, polyamides, elastomeric materials, urethanes, natural rubbers, synthetic rubbers, and mixtures thereof.

25. A process according to claim 1 wherein the porous sponge layer comprises a silicone elastomer.

26. A process according to claim 1 wherein the porous sponge layer comprises a polydimethylsiloxane elastomer.

27. A process according to claim 1 wherein the porous sponge layer comprises a polyvinyl chloride-polyvinyl acetate random copolymer.

28. A process according to claim 1 wherein the porous sponge layer comprises from about 20 to about 80 percent by weight of sponge material and from about 20 to about 80 percent by weight of ink.

29. A process according to claim 1 wherein the porous sponge layer comprises from about 20 to about 50 percent by weight of sponge material and from about 50 to about 80 percent by weight of ink.

30. A process according to claim 1 wherein the porous sponge layer is from about 12 to about 25 microns thick.

31. A process according to claim 1 wherein the porous sponge layer has pores of from about 0.5 to about 5 microns in average diameter.

32. A process according to claim 1 wherein the substrate comprises a material selected from a group consisting of condenser paper, glassine, polyester, polyvinylfluoride, polycarbonate, aluminized polyester, carbon black-filled polycarbonate, paper, polysulfones, polyethers, polyimides, polyamides, poly-$\alpha$-olefins, and regenerated cellulose, and mixtures thereof.

33. A process according to claim 1 wherein the substrate has a thickness of from about 2 to about 15 microns.

34. A process according to claim 1 wherein the substrate comprises a material selected from a group consisting of condenser paper, glassine, polyester, polyvinylfluoride, polycarbonate, aluminized polyester, carbon black-filled polycarbonate, paper, polysulfones, polyethers, polyimides, polyamides, poly-α-olefins, and regenerated celluloses and wherein a coating layer of a material selected from the group consisting of polyesters, polyamides, polyvinylchloride, polyvinylacetate, polyurethanes, polyolefins, polyvinyl alcohols, silicone oils, waxes, graphite, wax/polymer blends, and mixtures thereof is situated between the substrate and the porous sponge layer.

35. A process according to claim 1 wherein the multi-use thermal transfer element is employed to form images a plurality of times by applying heat imagewise to a portion of the multi-use thermal transfer element once and subsequently applying heat imagewise to the same portion at least 2 additional times.

36. A process according to claim 1 wherein the multi-use thermal transfer element is employed to form images a plurality of times by applying heat imagewise to a portion of the multi-use thermal transfer element once and subsequently applying heat imagewise to the same portion at least 14 additional times.

37. A process according to claim 1 wherein the multi-use thermal transfer element is prepared by:

i. dissolving a sponge material in a first solvent and dissolving an ink in a second solvent, wherein the first and second solvents are miscible with each other, the sponge material does not exhibit substantial solubility in the second solvent, and the ink does not exhibit substantial solubility in the first solvent, and the second solvent has a lower boiling point than the first solvent;

ii. preparing a mixture comprising the sponge material dissolved in the first solvent and the ink dissolved in the second solvent;

iii. coating the mixture onto a substrate;

iv. heating the mixture on the substrate to a temperature equal to or greater than the boiling point of the second solvent and lower than the boiling point of the first solvent, thereby causing the second solvent to evaporate; and v. thereafter heating the mixture on the substrate to a temperature equal to or greater than the boiling point of the first solvent, thereby causing the first solvent to evaporate, resulting in formation of a multi-use thermal transfer element comprising the substrate upon which is situated a porous sponge layer filled with ink.

38. A process according to claim 1 wherein the multi-use thermal transfer element is prepared by:

i. preparing an emulsion containing an ink and monomers that undergo polymerization upon exposure to ultraviolet light;

ii. coating the emulsion onto a substrate; and iii. exposing the coated substrate to ultraviolet light, thereby polymerizing the monomers and forming a multi-use thermal transfer element comprising the substrate upon which is situated a porous sponge layer filled with ink.

39. A process according to claim 1 wherein the multi-use thermal transfer element is prepared by:

i. dissolving a sponge material in a first solvent;

ii. suspending in the solution containing the sponge material a solid material that is insoluble in the first solvent and soluble in a second solvent;

iii. coating the solution containing the sponge material and the suspended solid material onto a substrate;

iv. causing the first solvent to evaporate, thereby forming on the substrate a sponge layer having the solid material embedded therein;

v. contacting the sponge layer with a second solvent in which the solid material is soluble, thereby causing the solid material to leach from the sponge layer, leaving pores in the sponge material; and vi. applying an ink composition to the porous sponge layer thus formed, thereby forming a multi-use thermal transfer element.

40. A process according to claim 1 wherein the multi-use thermal transfer element is prepared by:

i. dissolving a sponge material in a solvent;

ii. suspending in the solution containing the sponge material a blowing material that is nongaseous at temperatures equal to or below the boiling point of the solvent and gaseous at a temperature higher than the boiling point of the solvent;

iii. coating the solution containing the sponge material and the blowing material onto a substrate;

iv. causing the solvent to evaporate, thereby forming on the substrate a sponge layer having the blowing material contained therein;

v. heating the sponge layer to a temperature at which the blowing material is gaseous, thereby converting the blowing material to a gas and leaving pores in the sponge material; and vi. applying an ink composition to the porous sponge layer thus formed, thereby forming a multi-use thermal transfer element.

41. A process for forming images which comprises the steps of:

a. incorporating into a thermal transfer printing apparatus a multi-use thermal transfer element comprising a substrate upon which is situated a porous sponge layer filled with ink, said porous sponge layer comprising a material selected from a group consisting of copolymers of polyvinyl chloride, copolymers of polyvinyl acetate, polyesters, silicone polymers, polycarbonates, polysulfones, poly phenylene oxides, block copolymers of alpha methyl styrene, polyamides, elastomeric materials, urethanes, natural rubbers, synthetic rubbers, and mixtures thereof;

b. applying voltage imagewise to a portion of the substrate to heat the ink contained in the porous sponge layer, thereby enabling transfer of the ink in imagewise fashion from the porous sponge layer to a receiver sheet in contact with the porous sponge layer;

c. thereafter separating the receiver sheet of step (b) from the multi-use thermal transfer element;

d. subsequently contacting the porous sponge layer situated on the portion of the substrate heated in step (b) with a receiver sheet; and e. thereafter applying voltage imagewise to the portion of the substrate previously heated in step (b) to heat the ink contained in the porous sponge layer, thereby enabling transfer of the ink in imagewise fashion from the porous sponge layer to the receiver sheet of step (d).

42. A process according to claim 41 wherein the substrate comprises a polycarbonate filled with carbon black.

43. A process according to claim 41 wherein the substrate has a thickness of from about 6 to about 35 microns.

44. A process according to claim 41 wherein the porous sponge layer comprises an elastomeric material.

45. A process according to claim 41 wherein the porous sponge layer comprises a silicone elastomer.

46. A process according to claim 41 wherein the porous sponge layer comprises a polydimethylsiloxane elastomer.

47. A process according to claim 41 wherein the multi-use thermal transfer element can be employed to form images a plurality of times by applying voltage imagewise to a portion of the multi-use thermal transfer element once and subsequently applying voltage imagewise to the same portion at least 2 additional times.

48. A process according to claim 41 wherein the multi-use thermal transfer element can be employed to form images a plurality of times by applying voltage imagewise to a portion of the multi-use thermal transfer element once and subsequently applying voltage imagewise to the same portion at least 14 additional times.

49. A multi-use thermal transfer element comprising a substrate and a porous sponge layer filled with ink, wherein the ink contains a dye salt resulting from the reaction of a dye and a fatty acid.

50. A multi-use thermal transfer element according to claim 49 wherein the dye salt is present in the ink in an amount of from about 5 to about 80 percent by weight.

51. A multi-use thermal transfer element according to claim 49 wherein the dye is selected from the group consisting of Reactive Dyes and Basic Dyes.

52. A multi-use thermal transfer element according to claim 49 wherein the fatty acid is selected from the group consisting of saturated fatty acids with from about 12 to about 50 carbon atoms.

53. A multi-use thermal transfer element according to claim 49 wherein the fatty acid is selected from the group consisting of unsaturated fatty acids.

54. A multi-use thermal transfer element according to claim 49 wherein the fatty acid is selected from the group consisting of mixtures of saturated fatty acids and unsaturated fatty acids.

55. A multi-use thermal transfer element according to claim 49 wherein the ink also contains a pigment.

56. A multi-use thermal transfer element according to claim 49 wherein the fatty acid is selected from the group consisting of oleic acid, stearic acid, palmitic acid, myristic acid, and linoleic acid.

* * * * *